United States Patent [19]
Thony et al.

[11] Patent Number: 5,844,932
[45] Date of Patent: Dec. 1, 1998

[54] MICROLASER CAVITY AND EXTERNALLY CONTROLLED, PASSIVE SWITCHING, SOLID PULSED MICROLASER

[75] Inventors: Philippe Thony, Grenoble; Marc Rabarot, Seyssinet, both of France

[73] Assignee: Commissariat a l'Energie Atomique, Paris, France

[21] Appl. No.: 633,361

[22] Filed: Apr. 17, 1996

[30] Foreign Application Priority Data

May 12, 1995 [FR] France ..................... 95 05651

[51] Int. Cl.⁶ ........................................ H01S 3/08
[52] U.S. Cl. .................. 372/92; 372/98; 372/11; 372/22; 372/53
[58] Field of Search ................. 372/98, 11, 10, 372/22, 54, 53, 92

[56] References Cited

U.S. PATENT DOCUMENTS

| | | | |
|---|---|---|---|
| 5,430,754 | 7/1995 | Suzuki et al. | 372/22 |
| 5,495,494 | 2/1996 | Molva et al. | 372/98 |
| 5,502,737 | 3/1996 | Chartier et al. | 372/11 |

*Primary Examiner*—Leon Scott, Jr.
*Attorney, Agent, or Firm*—Oblon, Spivak, McClelland, Maier & Neustadt, P.C.

[57] ABSTRACT

Microlaser cavity and externally controlled, passive switching, pulses solid microlaser including a saturable absorber 46 and a device (60, 62) for introducing a beam 56 into the microlaser cavity initiating or starting saturation of the saturable absorber.

19 Claims, 5 Drawing Sheets

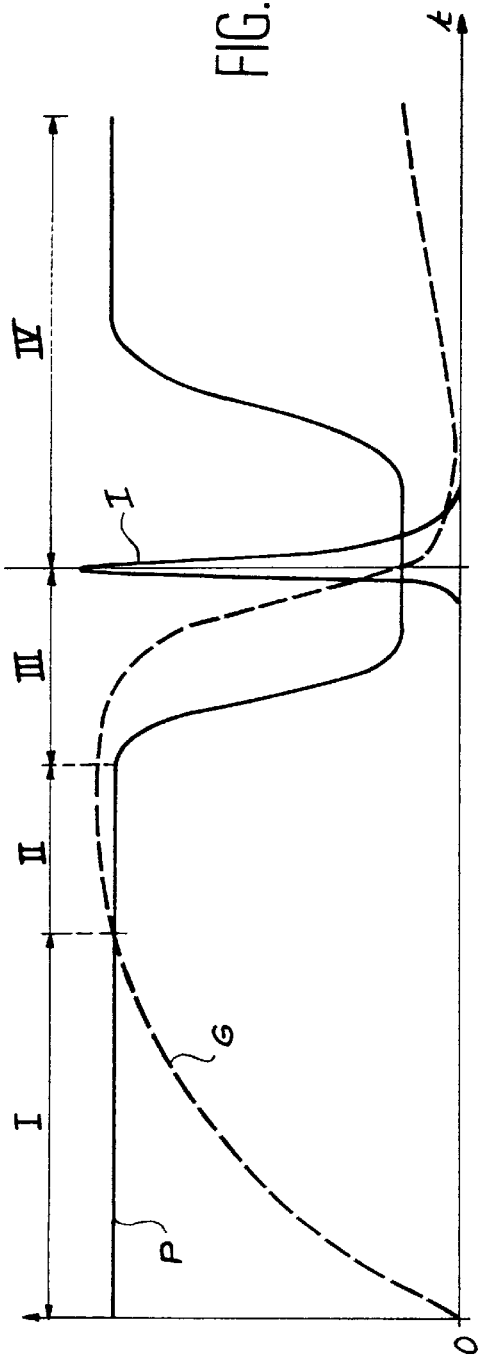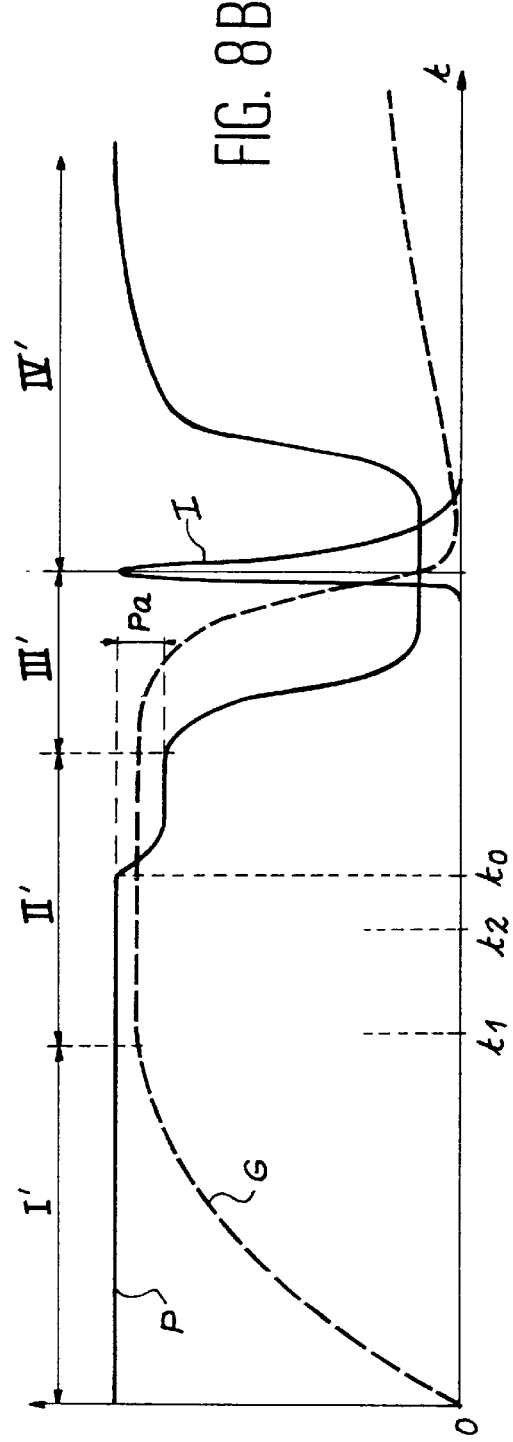

MICROLASER CAVITY AND EXTERNALLY CONTROLLED, PASSIVE SWITCHING, SOLID PULSED MICROLASER

FIELD OF THE INVENTION

The invention relates to the field of switched solid microlasers.

The main advantage of the microlaser is its structure in the form of a stack of multilayers, which constitutes its essential characteristic. The active laser medium is constituted by a material of limited thickness (between 150 and 1000 um) and small dimensions (a few mm$^2$), on which are directly deposited dielectric cavity mirrors. This active medium can be pumped by a III–V laser diode, which is either directly hybridized on the microlaser, or is coupled to the latter by an optical fibre. The possibility of mass production using microelectronic means authorizes the production of said microlasers at a very low cost.

Microlasers have numerous applications in fields as varied as cars, the environment, scientific instrumentation and telemetry.

DISCUSSION OF BACKGROUND

The known microlasers generally have a continuous emission of a few dozen mW power. However, most of the aforementioned applications require peak powers (instantaneous power) of a few kW supplied for $10^{-8}$ to $10^{-9}$ seconds with an average power of a few dozen mW.

In solid lasers, it is possible to obtain such high peak powers by making them function in the pulsed mode at frequencies between 10 and $10^4$ Hz, for which cavity switching processes are used. A cavity can be actively or passively switched.

In the case of active switching, the value of the losses is externally controlled by the user, e.g. with a rotary cavity mirror or intracavity electrooptical or acousto-optical means changing either the path of the beam, or its polarization state. The storage duration, the opening time of the cavity, and the repetition rate can be separately chosen.

In the field of microlasers, an active switching procedure is described in the article by J. J. Zayhowski et al entitled "Diode-pumped microchip lasers electro-optically Q-switched at high pulse repetition rates", published in Optics Letters, vol. 17, No. 17, pp 1201–1203, 1992. In this document, switching takes place in a configuration of two coupled Fabry-Perot cavities. Such an assembly is illustrated in FIG. 1, where the reference 2 designates the active laser medium and the reference 4 a switching electrooptical material (LiTaO$_3$). The laser active medium 2 forms, with an input mirror 6 and an intermediate mirror 8, a first Fabry-Perot cavity. The switching material forms, with the intermediate mirror 8 and the output mirror 10, a second Fabry-Perot cavity. Switching takes place by modifying the optical length of the switching material 4 by an external action, switching electrodes 12, 14 being placed perpendicular to the axis of the laser beam 16 on either side of the material 4. If a voltage V is applied between these electrodes, an electric field E=V/e, where e is the distance between the electrodes (which corresponds to the thickness of the electrooptical material), results. The optical index n$_2$ and consequently the optical length n$_2$L$_2$ of the electro-optical material is modified by the action of the field E. This affects the coupling of the cavities and modifies the reflectivity of the Fabry-Perot cavity formed by the mirrors 8 and 10 and by the switching material 4, seen by the laser medium.

For a YAG:Nd microlaser emitting at 1.06 $\mu$m and a switching material constituted by LiTaO$_3$ with an approximate thickness of 1 mm, we typically obtain: n$_1$=1.8, n$_2$=2, L$_1$=500 um, L$_2$=900 $\mu$m. The maximum reflectivity variation of the second cavity is obtained for approximately d$\lambda$/$\lambda$=dL$_2$/L$_2$=dn$_2$/n$_2$=10$^{-4}$. This index variation is obtained by applying an electric field of approximately 10$_4$ V/cm in the switching material. It is possible to liken the second, electrooptical cavity to an output mirror of the first cavity constituted by the laser material. The reflectivity of this output mirror is variable and controlled by the external control voltage applied to the electrodes 12, 14. FIG. 2 shows the variation of the reflectivity R of the second cavity as a function of the voltage V applied. For the case where three mirrors 6, 8, 10 have reflectivities respectively equal to 99%, 95% and 50%, the reflectivity of the second cavity will vary between 75 and 99%. For the active medium this amounts to varying the reflectivity of the output mirror between 75 and 99% by an external voltage control. On the basis of the graph of FIG. 2, it can be seen that it is necessary to apply several hundred volts to obtain a reflectivity close to 90% and approximately 1000 V to obtain a reflectivity of approximately 99%, in the case of an interelectrode distance of 1 mm.

This type of microlaser suffers from problems preventing its practical use.

Firstly the microlaser is manufactured manually (it involves the bonding of precut fragments). Therefore there is a lower limit placed on the geometrical dimensions which are a minimum of about 1 mm and in particular for the distance between the two electrodes. Another problem is the need to reach an adequate field E for switching. It is therefore necessary to apply a voltage of approximately 1000 V between the two electrodes in a very short time (less than 1 nanosecond) and on laser chips with a volume of approximately 1 mm$^3$. This is very difficult to implement in practice and requires sophisticated electronics incompatible with the simplicity and low production cost of the microlaser.

In the case of a passive switching, variable losses are introduced into the cavity in the form of a material called a saturable absorber or S.A., which is highly absorbent at the laser wavelength and low power density and which becomes virtually transparent when said density exceeds a certain threshold, which is called the saturation intensity of the saturable absorbent.

Compared with the actively switched microlaser, the passively switched microlaser is a self-switched device without any supply problem. There is neither a high voltage or a high current, so that it is much simpler to manufacture. However, the time control of the laser emission is much more difficult to implement. Thus, certain characteristics are regulated or set once and for all on manufacture. In particular, the loss level of the saturable absorber is fixed by its characteristics (composition, thickness, spectroscopic characteristics). Thus, two types of time drifts have been observed in the passively switched microlaser:

- a drift of the operating frequency in time, which can sometimes reach 50% in a few minutes (drift of 7 kHz on 16 kHz after approximately 10 minutes), said frequency drift often being accompanied by an amplitude fluctuation (to more than 10% in the same time period),
- a starting delay variation or jitter, which can be more than 10 nanoseconds.

Therefore the problem arises of finding an optically pumped, solid microlaser source combining the advantages of the passive switching system (no supplementary, complex supply electronics) and those resulting from the active switching system (time control and regularity in the frequency of the emission).

SUMMARY OF THE INVENTION

In order to solve this problem, the invention relates to a microlaser cavity having a solid active medium, characterized in that it incorporates a saturable absorber and means able to permit the introduction of a beam starting the saturation of the saturable absorber.

Thus, it is possible to control the cavity switching time by using only elements having a lower complexity than those used in the case of an actively switched microlaser. The saturable absorber is controlled so as to control the microlaser pulse starts.

The system functions in the following way. Firstly, the losses are at a high level in the microlaser cavity, because the saturable absorber is in its absorbent state and the gain rises in the amplifier medium. Secondly, when it has been decided to switch the microlaser, a control signal is supplied to the saturable absorber by the starting or initiating beam. The saturation of the absorber is started or initiated, the cavity losses are slightly reduced and are at the cavity gain. This leads to the production of a switched microlaser pulse.

From the time standpoint, this novel device has all the advantages associated with the actively switched device, i.e. precision of the repetition rate, control of the laser pulse start times and synchronization possibility within a system.

The laser pulse control signal is of low power. It is merely necessary to introduce a switching beam light pulse into the saturable absorber and the gain of the laser medium does the rest for completely saturating said saturable absorber. Therefore the power to be injected for starting switching is low, particularly when it is compared with the need of imposing a voltage of several hundred volts (up to 1000 V) in the case of the actively switched microlaser. In addition, it is much more economic to have an ancillary starting source than to have to develop a high voltage source for a small medium.

Another aspect of the invention relates to the relative arrangement of the saturable absorber and the active medium within the microlaser cavity.

In general terms, in the known lasers passively switched with the aid of a saturable absorber, the following arrangements have been proposed for the interior of the laser cavity.

1. A first arrangement is illustrated in FIG. 3A, where reference 20 represents a laser cavity and references 22, 23, 24, 25 respectively designate the active laser material, the saturable absorber and the input and output mirrors of the cavity.

There is no contact between the saturable absorber 23 on the one hand and the other elements of the cavity 20 on the other.

In this type of device, it is necessary to optically align the cavity elements. Moreover, optical settings may be necessary during the use of the laser.

2. In the arrangements illustrated in FIGS. 3B and 3C, a contact is ensured between the saturable absorber 26 and a mirror 27 (FIG. 3B), or the active laser material 28 (FIG. 3C) with the aid of an optical adhesive 29.

However, the adhesive introduces a residual absorption factor, as well as index differences at the adhesive-adhered material interface. Moreover, a possible parallelism deficiency between the adhered elements can also be the source of losses in the laser cavity.

3. FIGS. 3D and 3E illustrate a third possible arrangement. References 30, 31 respectively designate the laser cavity input and output mirrors. Reference 32 designates the active laser material, but the latter is codoped with active laser ions and saturable absorber ions. The same medium then serves as the active medium and the saturable absorber medium. It is therefore impossible to indepedently regulate the properties of the laser material and the saturable absorber.

However, the thickness of the medium influences both the absorption of the saturable absorber and the absorption of the active laser ions, as well as the laser mode structure.

In addition, the absorption coefficients of the active laser ions and saturable absorbers are directly linked with the concentrations of said ions, which are definitively fixed during the growth of the crystals and cannot be subsequently modified. Thus, a new crystal must be produced for each laser configuration.

Finally, in the case of passively switched lasers where the same ion (e.g. Er) is used both for the laser action and as the saturable absorber, it is impossible to use this codoping method. Thus, the same ion could serve as the active ion or as the saturable absorber ion, provided that the concentrations differ very widely. For the saturable absorber, the concentration must be much higher than for the active laser material.

To obviate the aforementioned problems, the invention proposes depositing the saturable absorber in the form of a thin film, directly on the active material of the microlaser cavity.

One of the main advantages of the invention, according to this particular embodiment, is in the structure of the microlaser cavity (or the laser microsystem consisting of a microlaser associated with the microoptics) in switched form, which then consists of a stack of layers, making it possible to retain the possibility of low cost mass production. This multilayer structure causes no problems with regards to the simplicity and mass production at low cost of the microlasers, such as have been developed for continuous microlasers. It makes it possible to produce fool-proof, self-aligned (no optical setting), monolithic, passively switched microlasers. This structure requires no adhesion or bonding operation and no complex alignment operation.

Another advantage of the microlaser compared with the "codoped" laser is that the active medium is separate from the saturable absorber, whilst preventing any adhesion of the two media and whilst retaining a monolithic structure. Thus, it is possible on the one hand to independently regulate the thicknesses (during the deposition of the layers or by mechanical thinning after the deposition of the layers) and the concentrations of the ions in the two media and on the other, as a result of this separation, implement switched lasers where the same ion (e.g. Er) can be used as the active ion and as the saturable absorber with different concentrations.

According to an even more specific embodiment of the invention, the starting beam introduction means are arranged so as to permit a guided propagation of the starting beam in the plane of the saturable absorber film.

Thus, the saturable absorber can have an etched microsurface so as to permit a guided propagation of the starting beam in the plane of the saturable absorber film, following the introduction of said beam into the microlaser cavity and the reflection of said beam against said microsurface.

In addition, means can be provided permitting the introduction into the microlaser cavity of a starting beam, parallel to the introduction direction into the microlaser cavity of an active laser medium pumping beam.

According to a variant, a recess can be made in at least part of the saturable absorber film, said recess permitting the positioning of the end of an optical fibre in the plane of the saturable absorber film.

According to another embodiment of the invention the means permitting the introduction of a starting beam are arranged so that this beam is propagated, in the microlaser cavity, in a direction not contained in the plane of the saturable absorber film.

More specifically, according to said embodiment, the means permitting the introduction of the starting beam have an off-axis microlens portion located on the side of the input mirror of the microlaser cavity.

According to another aspect of the invention, the film can be formed by an organic dye dissolved in a polymer solvent. According to a variant, the film can be deposited by liquid phase epitaxy.

Finally, the invention also relates to a microlaser incorporating a microlaser cavity such as has been described hereinbefore, cavity pumping means and means for generating a beam for starting the saturation of the saturable absorber.

BRIEF DESCRIPTION OF THE DRAWINGS

The invention is described in greater detail hereinafter relative to non-limitative embodiments and with reference to the attached drawings, wherein show:

FIGS. 8A and 8B the operation of a passively switched laser cavity, on the one hand according to the prior art (FIG. 8A) and on the other in the case of a microlaser according to the invention (FIG. 8B).

DETAILED DESCRIPTION OF EMBODIMENTS

In general terms, the invention firstly relates to a microlaser cavity having a solid active medium, between an input mirror and an output mirror, as well as a saturable absorber making it possible to passively switch the microlaser. Means are also provided for permitting the introduction of a beam for starting or initiating the saturation of the saturable absorber.

The starting beam can e.g. be obtained by a laser diode. This laser source type is compact and perfectly compatible with the reduced size of the microlaser. Moreover, the power emitted by a laser diode can be very easily modulated by means of the diode supply current. In the case of the envisaged application (starting a saturable absorber) it will preferably be ensured that the diode satisfies length and power conditions.

From the wavelength standpoint, the starting source preferably excites the saturable absorber on the same transition as the laser beam. The absorption of the latter is due to said transition and is consequently what is to be saturated. It is therefore possible to use a wavelength equal to the laser wavelength or a shorter wavelength corresponding to more energetic photons. In the latter case, it is preferably ensured that the excited centres are deexcited so as to drop to the correct energy level (in the case of a discreet distribution of the energy levels, or so that the wavelength chosen remains within the absorption band limit (in the case of an absorption band in the saturable absorber medium). In the example of a saturable absorber, whose impurities are constituted by $Cr^{4+}$ ions, a diode emitting at 980 nanometers is suitable for obtaining a starting beam.

With regards to the emitted power, only a small power quantity is necessary for initiating the absorption of the saturable absorber. If it is considered that the path in the laser medium and in the saturable absorber is short and that the losses on the starting beam power are limited, it is sufficient to have a starting or initiating source with a power of a few dozen milliwatts (between approximately 10 and 100 mW). This order of magnitude is compatible with commercially, low power diodes, such as III–V semiconductor diodes, which also have a low cost. When using such diodes, the wavelength adjustment is possible by adjusting the III–V semiconductor materials used in the laser diode. These adjustment processes are well known and will not be described in detail here. Reference can also be made to the article by Pocholle in SPECTRA 2000, No. 164, April 1992, p 27.

Figure 1:
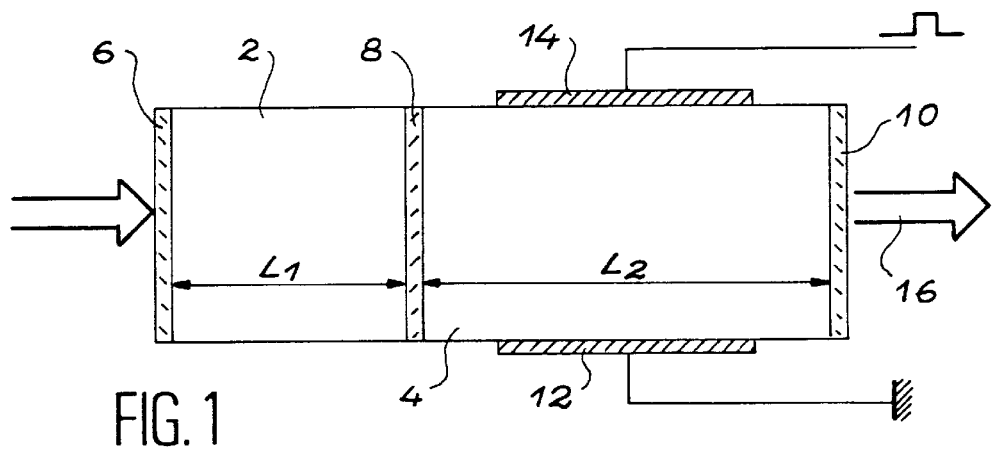
FIG. 1, already described, diagrammatically a prior art, actively switched microlaser.
Figure 2:
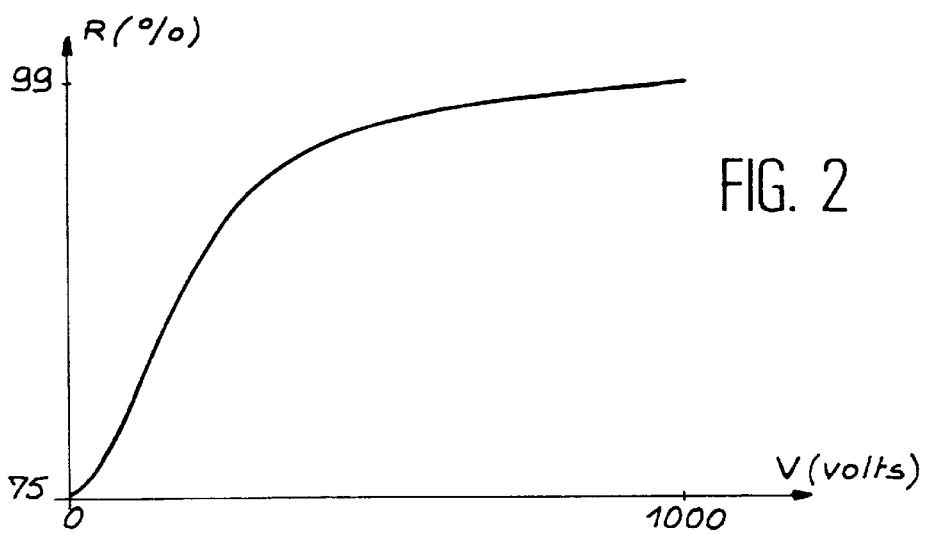
FIG. 2 the reflectivity of the second cavity seen by the active laser medium of the first cavity in an actively switched microlaser according to the prior art.
Figures 4A, 4B:
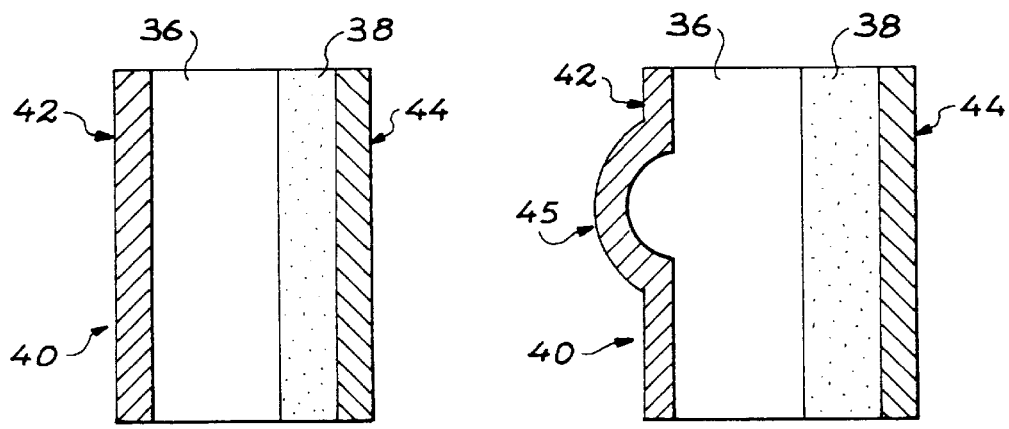
FIGS. 4A and 4B a microlaser cavity with a saturable absorber film in the plane-plane or planoconcave mode.
Figure 3A:
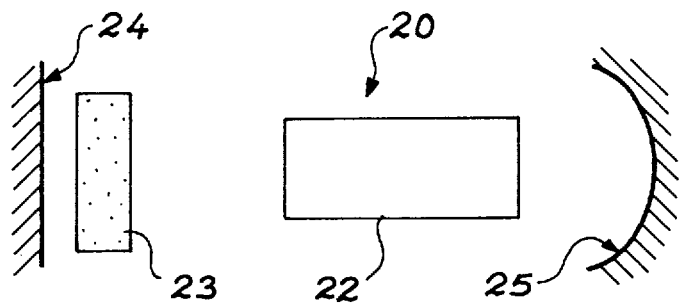
FIGS. 3A to 3E, already described, diagrammatically various possible arrangements of a prior art laser cavity.
Figure 3B:
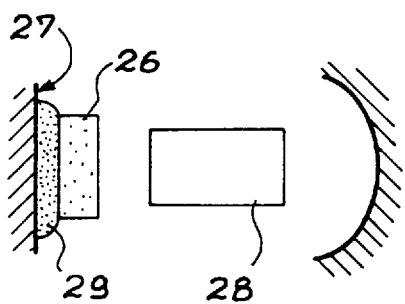
Figure 3C:
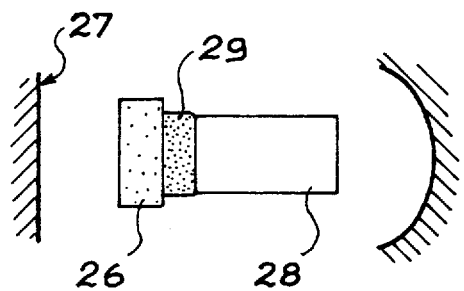
Figure 3D:
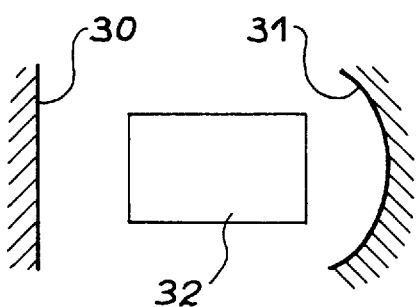
Figure 3E:
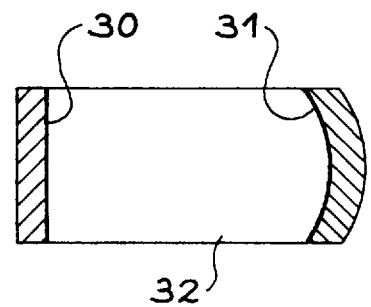

The invention will now be described in the case where the saturable absorber is in the form of a film. In particular, it can be advantageous to deposit the saturable absorber film directly on the amplifier medium, as illustrated in FIGS. 4A and 4B. The reference 36 therein designates the active laser medium, the reference 38 a saturable absorber film and these two elements are located between two mirrors 42, 44 which close the laser cavity. Reference 40 designates the complete cavity.

Optionally and as illustrated in FIG. 4B, it is possible to manufacture by a prior art method (A. Eda et Al., CLEO'92, paper CWG33, p 282 (Conf. on Laser and Electro-optics, Anaheim, USA, May 1992)) a microlens array 45 of transparent material (e.g. silica) on the surface of the laser material 36. The typical microlens dimensions are a diameter of 100 to a few hundred microns and a radius of curvature of a few hundred micrometers to a few millimetres.

These microlenses are used for obtaining "stable" cavities (the plane-plane cavity is not stable) and which are of the planoconcave type. In the case of optical pumping, they also make it possible to focus the pumping beam.

The material from which the active medium 36 is made will e.g. be doped with neodymium (Nd) for a laser emission of around 1.06 µm. This material could e.g. be chosen from among one of the following materials: YAG ($Y_3Al_5O_{12}$), LMA ($LaMgAl_{11}O_{19}$), $YVO_4$, YSO ($Y_2SiO_5$), YLF ($YLiF_4$), $GdVO_4$, or SYS ($SrY4(SiO_4)_3O$), etc. This choice will be conditioned by the following criteria, but will obviously be dependent on the particular applications.

If the laser cavity is optically pumped, preferably with one or more laser diodes, the material must have a high absorption coefficient at the pump wavelength (e.g. III–V laser diode emitting at about 800 nm) to increase the pumping efficiency, whilst retaining a low material thickness (<1 mm).

A wide absorption band at the wavelength of the pump, e.g. 800 nm, in order to satisfy the problem of wavelength stabilization of the laser diode, so as to simplify the choice and electrical control of the pumping laser diode.

A considerable effective, stimulated emission cross-section, in order to obtain high efficiencies and high output powers.

A limited emission band width so as to easily obtain a monofrequency laser, or conversely a wide emission band to bring about a frequency-tunable laser emission.

Good thermomechanical properties in order to simplify the machining of the material and limit the prejudicial thermal effects by a good dissipation of the heat produced by the absorption of the pump (said excess heat depending on the energy efficiency of the laser).

A long life in the excited state for a high energy storage, or a short life for a rapid switching rate.

Large dimensions so as to be able to simultaneously mass produce the largest possible number of microlasers with a single laser crystal.

Among the known materials, the most appropriate for the operation of the microlaser are (with comparable life periods of a few hundred microseconds):

$YVO_4$, which has a good coefficient and a wide absorption band, together with a good effective cross-section, YAG, whose absorption coefficient and effective stimulated emission cross-section are average and whose absorption and emission band widths are low, being in the form of large dimensions and with a good thermal conductivity, LMA, which offers low absorption coefficient and effective cross-section, the absorption and emission bands being wide, whilst it can also have large dimensions.

With respect to the active ions (dopants), they are generally chosen from among:

Nd for an emission at around 1.06 $\mu$m,

Er or an erbium-ytterbium Er+Yb codoping for an emission around 1.5 $\mu$m,

Tm or Ho or a thulium and holmium codoping for an emission around 2 $\mu$m.

Another decisive parameter is the thickness e of the active medium 36. The thickness e conditions the characteristics of the microlaser:

on the one hand, the absorption of the pumping beam will be greater as the thickness e increases, on the other, the number of longitudinal modes of a Fabry-Perot cavity increases with the thickness and if it is wished to obtain a longitudinal monomode laser this thickness must be small.

If dg is the width of the gain band (laser emission) of the material, the number of modes N will be given by:

$$N = dg/dv, \text{ and } dv = \frac{C}{2nL}$$

in which C is the speed of light and n the refractive index of the material.

For a monofrequency laser, generally a minimum thickness is chosen for N=1, provided that said thickness is >100 $\mu$m. Typical thicknesses for obtaining a single mode are:

YAG L=750 $\mu$m, $YVO_4$ L=500 $\mu$m,

LMA L=150 $\mu$m.

In practice, the thickness e will vary between 100 $\mu$m and 5 mm.

In the embodiments illustrated in FIGS. 4A and 4B, the saturable absorber 38 is in the form of a thin film. Two types of film can be used:

a polymer containing saturable absorber molecules and typically for a 1.06 $\mu$m microlaser use is made for the saturable absorber of an organic dye such as bis(4-diethylaminodithiobenzyl) nickel (BDN, Kodak, CAS No. 51449-18-4) in a solution containing by weight 6% polymethyl methacrylate (PMMA) in chlorobenzene.

Variants are described hereinafter in conjunction with the description of a preparation process.

This type of solution will be deposited using a trammel directly onto the laser material (cf. hereinafter for the preparation process). This leads to films with a thickness of approximately 1 to 5 $\mu$m, e.g. 2, 3 or 4 $\mu$m. Another type of film will be obtained by liquid phase epitaxy (LPE), directly on the laser material or any other process making it possible to obtain the same deposit (same material, same doping, same properties). Thus, the film will generally have been obtained by LPE. The LPE preparation process is described hereinafter and makes it possible to obtain, on the substrate 36 constituted by the active solid medium, a film of thickness between 1 $\mu$m and 500 $\mu$m (e.g. 100, 200, 300 and 400 $\mu$m). It is constituted by a basic material identical to that of the active solid medium (e.g. YAG), but it is doped with ions giving it saturable absorber properties, e.g. $Cr^4$ for a 1.06 $\mu$m laser or $Er^{3+}$ for a roughly 1.5 $\mu$m laser or $Ho^{3+}$ for a roughly 2 $\mu$m laser.

The type of dopant is adapted to the laser which it is wished to switch, so that the epitaxied film has a saturable absorption at the emission wavelength of said laser.

Therefore, in this case, the active laser material and the saturable absorber film have the same crystalline structure and only differ through the different dopants which affect the crystalline and optical properties of these two media.

The properties of the film in the two cases will differ very widely. Thus, definition takes place for each film type of the damage threshold. Beyond a certain power density present in the laser cavity, it is possible to destroy the saturable absorber film. This limiting power density, known as the damage threshold, will be lower in the case of the polymer with the organic dye than in the case of the LPE-deposited film. Therefore in the first case it is necessary to operate with lower energy levels in the cavity than in the second case.

Moreover, in one case the index difference between the laser material 8 and the polymer 12 introduces an optical interface between the two media. In the other case, it is only possible to carry out LPE on the same material (e.g. YAG on YAG, only the doping differing), which limits the extent of the applications, but makes it possible to adjust the index of the epitaxied film to that of the active laser material serving as the epitaxy substrate, so as to avoid the formation of an optical interface between the two media.

Finally, the nature of the film will influence the time form of the emission or laser pulse train. In the case of an organic dye dissolved in a polymer, the dye decline time is very short (~1 ns), whereas in the case of the epitaxied film the ions constituting the impurities ($Cr^{4+}$, $Er^{3+}$, $Ho^{3+}$) have much longer decline times of approximately 1 microsecond or more. These properties will obviously condition the choice of the film as a function of the intended use.

In order to obtain a complete laser cavity, the active medium with its saturable absorber film or films will be located between two mirrors 42, 44. The input mirror, deposited by known methods, is preferably a dichroic mirror having a maximum reflectivity (as close as possible to 100%) at the laser wavelength and the highest possible transmission (>80%) at the pump wavelength (generally 800 nm for Nd doped materials, 980 nm for Er doped materials and 780 nm for Tm doped materials). The output mirror is then also of the dichroic type, but allows the passage of a few percent of the laser beam. This gives a laser cavity with structures as shown in FIGS. 4A and 4B.

It is immediately clear what is the advantage of such a structure, because at no time does it require an optical alignment of the different components and also introduces no optical adhesive, whilst avoiding the problems associated with a structure, where the active medium is codoped with active laser ions and saturable absorber ions.

The pumping of such a cavity is preferably an optical pumping. Thus, III–V laser diodes are particularly suitable for pumping a microlaser cavity.

According to the invention, a microlaser of the aforementioned type can be switched in controlled manner by starting the saturation of the saturable absorber with the aid of a starting beam provided for this purpose. Variants will now be described in conjunction with FIGS. 5, 6, 7A and 7B.

Figure 5:
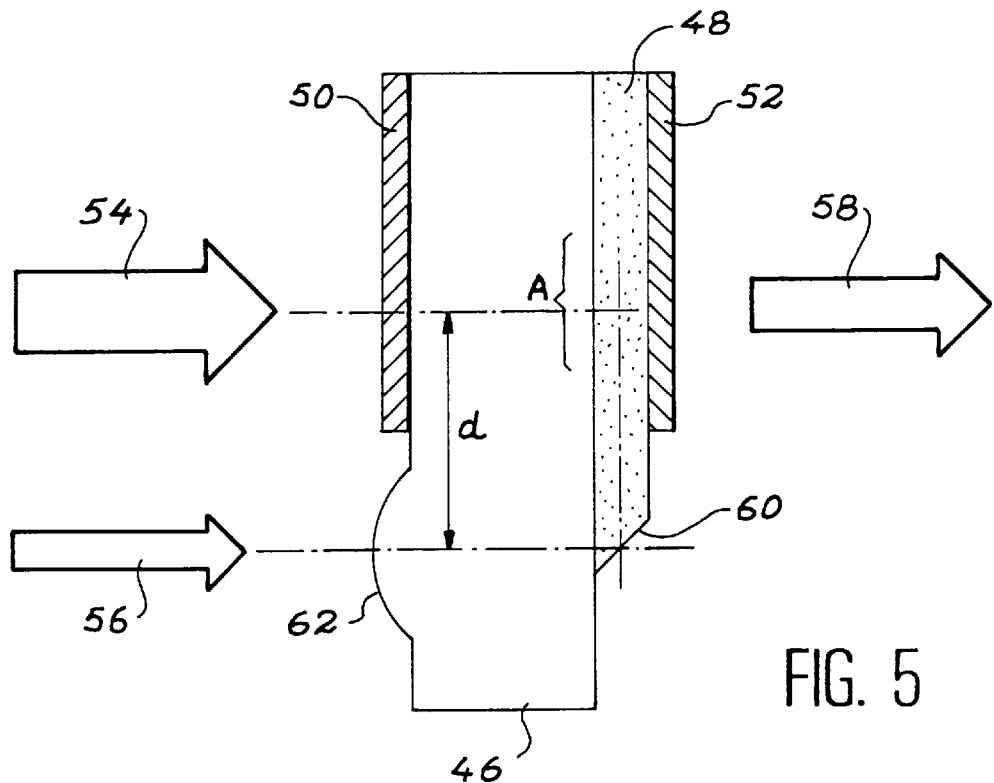
FIGS. 5 and 6 embodiments of a microlaser according to the invention.

In FIG. 5, reference 46 designates the active laser medium, 48 a saturable absorber film, 50 and 52 the input and output mirrors of the microlaser cavity. An active laser medium pumping beam is diagrammatically represented by an arrow 54, whilst 56 designates a beam for starting the saturation of the saturable absorber 48. The configuration shown in FIG. 5 is a so-called transverse configuration, i.e. the starting beam 56 is propagated in the saturable absorber film perpendicular to the axis of the pumping beams 54 of the laser cavity and the laser beam 58 emitted by the microlaser. Thus, in the case of a saturable absorber in thin film form, said transverse configuration is particularly advantageous to the extent that the film will serve as a guide for the starting beam. The latter will thus propagate to the level of the zone indicated by the letter A in FIG. 5, i.e. the zone where the laser beam in the cavity encounters the saturable absorber. In preferred manner, within, the saturable absorber film, it is desirable for the starting beam propagation to take place over the shortest possible distance d, because the latter is absorbed throughout its propagation in the film. However, the distance d is determined by the size of the microoptical componets used for injecting the pumping and starting beams into the microlaser cavity.

Moreover, the index of the saturable absorber film can be adapted to the guided propagation mode (codoping with gadolinium (Ga) and lutetium (Lu), the first serving to adapt the index and the second making it possible to compensate the widening of the crystal lattice due to the introduction of the first).

In this embodiment, in order to inject the starting beam 56 into the microlaser cavity, it is possible to have recourse to microoptical methods. Thus, the film 48 can be etched so as to obtain a planar or non-planar face 60 making it possible to reflect the starting wave. The inclination of said etched surface 60 is preferably such that there is a total reflection of the starting wave. If there is no total reflection, it is possible in a variant to carry out a reflecting treatment of the surface 60.

For a saturable absorber film of limited thickness (approximately below 10 $\mu$m), the etched surface can be obtained by photolithography and a variable density mask. For greater thicknesses (above 10 $\mu$m) a bevel polishing can be used for obtaining the surface 60.

The starting beam 56 can be focussed as from its entry into the laser medium, e.g. with the aid of a microlens 62 etched on the microlaser input face in an area adjacent to the pumping beam axis. In the configuration shown in FIG. 5, the laser medium pumping beam 54 and the saturable absorber starting beam 56 are located on the same side of the microlaser.

The focussing function of the starting beam 56 can also be obtained by any other means, such as e.g. a diffractive lens, Fresnel lens, etc.

Figure 6:
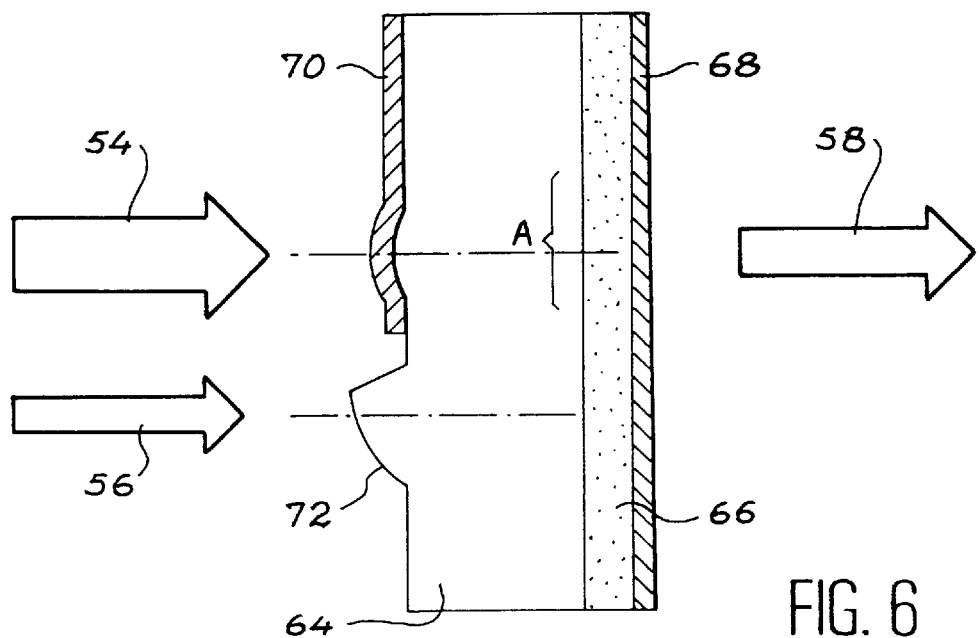

In the embodiment of FIG. 6, the references 64, 66, 68, 70 respectively designate the laser amplifier medium, a saturable absorber film, the output and input mirrors of the microlaser cavity. The pumping, starting and laser beams are designated by the same references as in FIG. 5.

The embodiment of FIG. 6 is quasi-longitudinal, i.e. the starting beam 56 is propagated towards the saturable absorber film in a direction not contained in the plane of said film. This embodiment requires no etching of the saturable absorber film, unlike in the embodiment described in conjunction with FIG. 5. Once again the starting beam can be supplied parallel to the pumping beam 54 in the direction of the microlaser cavity input face. At said input face it is deflected towards an area A of the saturable absorber film on which the pumping beam is incident. The deviation can be obtained by an off-axis microlens portion 72 obtained by etching the active laser medium 64 with the aid of a variable density mask in an area close to the axis of the pumping beam.

In the cases described hereinbefore, the starting 54 and pumping 56 beams are parallel to the laser beam 58 obtained at the microlaser cavity output.

Figure 7A:
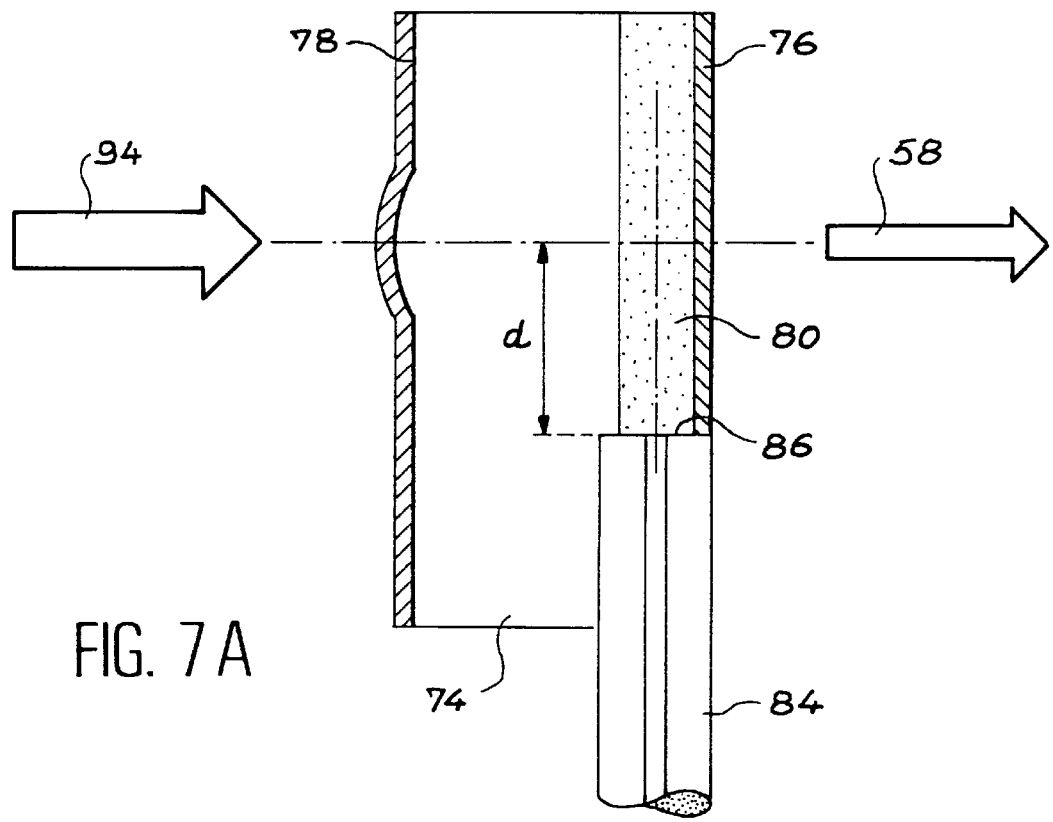
FIGS. 7A and 7B another embodiment of a microlaser according to the invention with the injection of the starting beam by optical fibre.
Figure 7B:
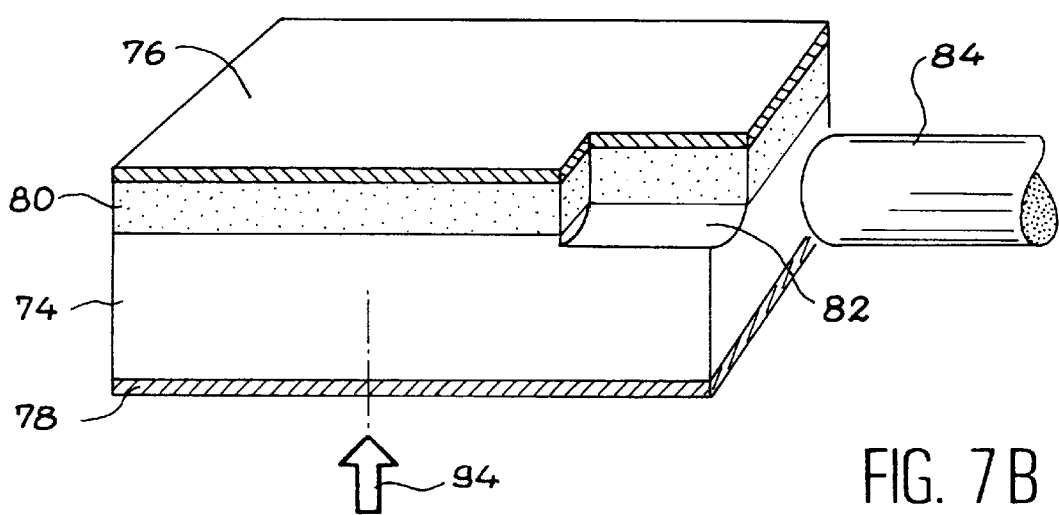

Another embodiment will now be described in conjunction with FIGS. 7A and 7B. In said drawings, a thin saturable absorber film is designated by the reference 80 and is deposited on an amplifier medium 74, the means being located between an input mirror 78 and an output mirror 76 of the thus obtained microlaser cavity. A groove or notch 82 is made in at least part of the saturable absorber and optionally, as illustrated in FIGS. 7A and 7B, in the output mirror and in part of the amplifier medium, so as to be able to position the end of an optical fibre 84 permitting the injection of the saturable absorber starting beam 80 directly into the same without making it pass through the amplifier medium. Here again the geometry is transverse and the starting beam is propagated in the film 80 serving as a guide for the same. An advantage of this configuration is that it also makes it possible to reduce the distance d over which the starting beam will propagate in the film 80 between the output end 86 of the fibre 84 and the area of the saturable absorber 80 on which the pumping beam 54 is incident.

The size of the groove 82 is a function of the diameter of the starting fibre 84, which can be a multimode fibre. It can also be a monomode fibre because, as explained hereinbefore, the power which has to be transmitted to the saturable absorber is relatively low being a few dozen milliwatts. The choice of a monomode fibre also makes it possible to minimize the overall dimensions, because it has a smaller diameter than a multimode fibre. Moreover, in the case of saturable absorber films with a thickness of a few micrometers, a monomode fibre will also be suitable, as a result of its small core diameter.

For all the embodiments described hereinbefore and with respect to the choice of the source supplying the starting beam 56, the conditions to be respected for the wavelength and power are preferably the same as described hereinbefore. Thus, a III–V semiconductor diode, whose spectral emission properties are adjusted by the choice of the semiconductor material, can also be suitable for the different embodiments described.

Moreover and once again for all the embodiments described hereinbefore, it is clear that the presence of means able to permit the introduction of a beam for initiating the saturation of the saturable absorber does not prejudice the compact character of the microlaser structure. Moreover, each element is not introduced into the microlaser, which requires an optical setting of the latter. Finally, no parasitic element of the optical adhesive type is required. In particular, the benefit of a saturable absorber structure in the form of a film directly deposited on the active laser medium is retained.

The operation of a device according to the invention will now be described in conjunction with FIGS. 8A and 8B. These drawings show the time evolutions and the different operating conditions for the loss levels and gain of a microlaser cavity, as well as a laser pulse obtained by switching the cavity.

FIG. 8A corresponds to the case where the microlaser cavity is of the conventional type, i.e. without any means for initiating or starting the saturation of the saturable absorber. It is firstly possible to see a phase I in which the system has no laser effect, because the saturable absorber imposes within the microcavity a loss level P higher than the gain G obtained by pumping; However, said gain increases, because the solid amplifier medium stores the energy of the pumping beam (with a saturation effect due to the reemission of the energy by fluorescence). As from a certain stored pumping power value, the gain G reaches and exceeds the total loss level of the cavity (residual loss+output transmission+high saturable absorber loss), i.e. phase II (cf. FIG. 8A). During phase II, the few photons emitted by fluorescence at the laser wavelength start to be amplified by the highly pumped laser medium despite the still high losses. Then, at the start of phase III, the absorber is saturated until it becomes transparent and the laser pulse I is emitted. This phenomenon is very fast, the absorber being suddenly saturated under the avalanche of amplified photons in the laser amplifier medium. The losses switch to their lowest level, whereas the gain has remained at a high level, so that a laser pulse is emitted. Thus, the gain will decrease very rapidly until it drops below the threshold imposed by the loss level P. Then (phase IV), the saturable absorber returns to its starting state, because its active centres are deexcited in various ways (by spontaneous emission of photons, phonons, etc.) and the modulator constituted by the saturable absorber closes again.

In the case of a microlaser cavity according to the present invention, the time evolution of these same quantities (loss P, gain G, laser pulse I) is shown in FIG. 8B. In a first phase I', the loss level P exceeds the gain G within the microlaser cavity, said gain level being a rising function of time. The maximum loss level P is fixed by the saturable absorber (composition, thickness, spectral characteristics), whilst the gain level G is determined by the intensity of the microlaser cavity pumping beam. Thus, this pumping level will be regulated in such a way that the gain does not reach the loss level P (otherwise the saturable absorber would enter phase II according to the standard FIG. 8A). The introduction of the starting or initiating beam at time $t_0$ (e.g. with the aid of the synchronization means for the laser cavity pumping source and the starting beam source), corresponds to the introduction of a power $P_a$ in light form into the saturable absorber, said power being adequate to bring the loss level P within the cavity beneath the gain level. As soon as the saturable absorber saturation is initiated in this way, it rapidly decreases the loss level (phase III' in FIG. 8B), which thus becomes well below the gain level and a laser pulse I is emitted. Finally, in phase IV', the gain level rapidly decreases to below the threshold imposed by the losses and the saturable absorber returns to its starting state, its active centres being deexcited, so that a cycle can recommence. The time at which the starting beam is switched can be chosen by the user, so that in FIG. 8B it can be chosen at $t_1$, $t_2$ or $t_0$.

By comparing these two diagrams, it is possible to consider the saturable absorber as a controlled loss modulator:
  in the conventional diagram (FIG. 8A), by a light source within the laser microcavity, the latter being very noisy and this high noise level leads to indetermination on the microcavity switching time,
  in the diagram according to the invention (FIG. 8B), by an external starting source, which makes it possible to obtain freedom from the random character inherent in the standard operating diagram.

A process for the production of a microlaser according to the invention will now be described. The following stages occur in this process.

1) The first stage consists of choosing the active laser material and conditioning the chosen laser crystal, the latter being oriented and cut into plates with a thickness between 0.5 and 5 mm.

2) The following stage is a stage of grinding and polishing the plates and serves to remove the surface cold working coating due to the cutting and brings the thickness of the plates to a level slightly exceeding the microlaser specification. The ground plates close to the final thickness e are polished on both faces with an optical quality. The cutting, grinding and polishing are carried out using known processes and known machines.

3) A saturable absorber preparation stage.

3a) In the case of a conventional saturable absorber, various processes are known making it possible to obtain a switched microlaser cavity. It is in particular possible to carry out a codoping of the basic material of the active laser medium in order to give active laser medium and saturable absorber properties (e.g. YAG doped with neodymium $Nd^{3+}$ and chromium $Cr^{4+}$ ions).

3b) In the case of the saturable absorber deposited in thin film form, two deposition types can be implemented.

3b1) First deposition type: deposition of a saturable absorber organic dye dissolved in a polymer.

Typically, for a microlaser operating at 1.06 $\mu$m, it is possible to use as the saturable absorber an organic dye such as bis(4-diethylaminodithiobenzyl) nickel (BDN, Kodak, CAS No. 51449-18-4) in a polymethyl methacrylate (PMMA) solution. For this purpose preparation takes place of a solution containing 6% by weight polymethyl methacrylate (Polyscience mean weights) in chlorobenzene (Prolabo) stirring for 24 hours. To it is added 0.2 wt. % BDN, followed by stirring for a further 2 hours. The solution is then filtered and deposited on the substrate on its output face (opposite to the input face having the dichroic mirror), this taking place in dropwise manner with a circular centrifugal movement. It is possible to use for this purpose a trammel, which is a standard machine such as that used in microelectronics for the deposition of resins used in lithography operations. The substrate is previously cleaned with respect to all traces of impurities resulting from the polishing operation. It is rotated for 20 seconds at 2000 r.p.m. and then 30 seconds at 5000 r.p.m. The film is then dried for 2 hours in an oven at 70° C.

This gives a 1 $\mu$m thick film containing 3% of active molecules (BDN) and whose optical density is 0.13 at 1.06 $\mu$m (74% transmission) before saturation. Such a saturable absorber has a relaxation time close to 10 ns and is saturated at an intensity close to 1 mW/cm².

By varying the concentration parameters of the polymer, its molecular weight or solvent, the dye proportion and the trammel rotation speed, it is possible to adjust the saturable absorber performance characteristics. The specifications typically obtained are:

film thickness:1 to 5 $\mu$m (e.g. 2, 3, 4 $\mu$m),
molecule density:5 to 10 wt. %,
dye:BDN, mm=685 g,
glass transition point:Tg=78° C.,
absorption at 1.06 $\mu$m:10 to 70%,
saturation rate:90%,
effective cross-section:$10^{-16}$ cm$^2$,
relaxation time:2 to 15 ns,
saturation intensity:0.1 to 1 mW/cm$^2$,
non-uniformity of film:<5% on 1 cm
depolarization rate:<$10^{-5}$,
losses at 800 nm:<1%,
repetition rate:10 to 10,000 Hz,
photostability:$10^8$ strokes,
deposition method:trammel.

Other polymers, such as polyvinyl alcohol or polyvinyl acetate or even polystyrene can be used in their respective solvents in place of PMMA. It is also possible to use as the dye bis(4-dimethylaminodithiobenzyl) nickel (BDN, Kodak, CAS No. 38465-55-3).

The dye can also be incorporated into a silica gel or grafted to the polymer chain.

Numerous other dithiene metal complexes can be used as the dye for other wavelengths, as described in the articles of K. H. Drexhage et al, Optics Communication 10(1), 19, 1974 and Mueller-Westerhoff, Mol. Cryst. Liq. Cryst. 183, 291, 1990.

The method can also be used for switching lasers operating at wavelengths other than 1.06 $\mu$m. For example switching will take place of Er or Er+Yb lasers (Er or Er+Yb doped materials where the active ion is Er) emitting at about 1.5 um using tetraethyloctahydrotetraazapentaphene-dithiolato-nickel (cf. article by Mueller-Westerhoff indicated above).

3b2) Second deposition type:deposition of a film by liquid phase epitaxy (LPE).

The saturable absorber film is obtained by soaking the substrate on which it is deposited in an appropriately chosen, supersaturated solution. This solution or epitaxy bath is a mixture of a solvent and a solute constituted by different elements forming the final material. The substrate and film have the same crystalline structure and only differ through the different dopants affecting the crystalline and optical properties of the film. The active ions such as Nd, Er and Yb make the material amplifying, whilst other ions (Cr and Er) give it saturable absorber properties, whilst certain other ions can be used for varying the refractive index or crystal lattice of the material (e.g. Ga, Ge, Lu, etc.). It is thus possible to control the properties of the films produced.

This process can be used for any material in the form of monocrystals (for producing substrates) and which can be prepared by liquid phase epitaxy. This is the case of the aforementioned materials for the basic material of the active laser medium: $Y_3A_{15}O_{12}$ (YAG), $Y_2SiO_5$ (YSO), $YVO_4$, $YLiF_4$ (YLF) or $GdVO_4$ or $SrY_4$ ($SiO_3$(SY). The bath composition (choice of solvent and substituents), the concentrations in the solute of different oxides and the experimental growth conditions (temperature range, operating procedure, etc.) are adjusted for each material so as to obtain films having the optimum crystalline quality.

In the case of garnets (YAG), the chosen solvent is a $PbO/B_2O_3$ mixture and the solute has an $Al_2O_3$ excess in order to stabilize the garnet phase. The solute/solvent ratio is then calculated so as obtain growth at about 1000° C.

As a function of the bath composition, the temperature and the deposition time, it is possible to adjust the thickness ($1 \leq e \leq 200$ um, e.g.:25 $\mu$m, 50 $\mu$m, 75 $\mu$m, 100 $\mu$m, 125 $\mu$m, 150 $\mu$m, 175 $\mu$m, e$\leq$200 $\mu$m also being possible) and the dopant concentration in the films. The growth of a film takes place at constant temperature, which makes it possible to obtain a homogeneous dopant concentration in the film thickness. The substrate is given a uniform or alternating rotary movement, which leads to a good thickness uniformity.

It is possible to obtain a substrate carrying one or two S.A. films, depending on whether soaking takes place of one face of the active laser medium in the bath, at the surface thereof, or both faces, the laser material being completely immersed in the bath.

The epitaxied face or faces obtained can be repolished in order to remove roughness which may be caused by the epitaxy process and so as to bring the thickness of the epitaxied film or films to the desired level for the operation of the microlaser.

4) A stage of depositing in put and output mirrors. These can be dichroic mirrors obtained by a deposition of dielectric multilayers, which is a known, commercially available process.

The deposition of the input mirror can take place before or after the preceding stage, in the case of S.A. polymer deposition, but must be performed afterwards in the case of liquid phase epitaxy, which occurs at high temperature and may destroy the mirror.

5) A stage of cutting plates for obtaining microlaser chips.

The small plates having the mirrors, the saturable absorber and the active laser medium, as well as optionally the microlenses are cut with a diamond saw of the type used in microelectronics for Si chip cutting, so as to obtain laser chips with a section of a few mm$^2$.

6) The specific stages of the embodiments illustrated in FIGS. 5 and 6 have already been described (etching the film 80 for forming the reflecting surface 60 and formation of microlenses 62, 72). Moreover, the formation of the groove 82 in the embodiment illustrated in FIGS. 7A and 7B is obtained by a conventional etching procedure.

The microlaser source according to the invention has all the advantages of the microlaser, all the characteristics of actively switched pulsed lasers and all the advantages of passively switched pulsed lasers.

It can also be mass produced, so that the production costs are reduced, because the samples are produced in batches, a good reliability of each laser within a batch and an absence of settings and greatly reduced laser maintenance.

The production process greatly benefits from processes developed for passively switched microlasers. In addition, the microlaser structure remains very simple, very reliable and very robust.

The time operation is identical to that of active switching, i.e. with precision of the repetition rate, control of the pulse starting times and synchronization possibility within a system. This time behaviour can be modelled and researched.

The laser pulse control signal is of low power, it being sufficient to initiate the saturation of the absorber and the laser medium gain does the rest in order to completely saturate the absorber.

Finally, the higher the control signal, the lower the noise on the starting time. Thus, the greater the saturation advance of the absorber, the more the latter is controlled by the exterior and not by the photons within the laser cavity, which constitute a noise source. With this switching system, a compromise can be made between the precision of the emission time characteristics and the energy consumption of the switching system.

Among possible industrial applications of microlasers, reference is made to laser telemetry, laser micromachining and designation, pollutant detection and three-dimensional imaging. In addition, the switching device can be adapted to a very wide wavelength range.

We claim:

1. Microlaser cavity structure including a microlaser cavity, a solid active medium, an input mirror and an output mirror respectively defining an input side and an output side of said microlaser cavity, said structure further including a thin saturable absorber material film directly deposited on the active medium and means for introducing into said cavity a starting beam, for starting a controlled saturation of the saturable absorber, said starting beam being introduced parallel to an introduction direction into the solid active medium of a pumping beam of said active medium, said saturable absorber film defining a plane, and the starting beam introduction means being arranged so as to permit a guided propagation of the starting beam in said plane of said saturable absorber film.

2. Microlaser cavity according to claim 1, said saturable absorber film having an etched microsurface so that, after an introduction of said starting beam into the microlaser cavity, said starting beam is reflected against said etched microsurface, and then propagates and is guided in said plane of said saturable absorber film.

3. Microlaser cavity structure including a microlaser cavity, a solid active medium, an input mirror and an output mirror respectively defining an input side and an output side of said microlaser cavity, said structure further including a thin saturable absorber material film directly deposited on the active medium, and means for introducing into said cavity a starting beam, for starting a controlled saturation of the saturable absorber, said starting beam being introduced parallel to an introduction direction into the solid active medium of a pumping beam of said active medium, said means for introducing a starting beam directing said beam in a direction not contained in the plane of the saturable absorber film, towards an area of the saturable absorber on which the pumping beam is incident.

4. Microlaser cavity according to claim 3, wherein said means for introducing a starting beam includes a microlens portion located on the input side of said microlaser cavity.

5. Microlaser cavity according to claim 1 or 3, the film being formed by an organic dye dissolved in a polymer solvent.

6. Microlaser cavity according to claim 5, the organic dye being chosen from among bis(4-diethylaminodithiobenzyl) nickel or bis(4-dimethylamino-dithiobenzyl) nickel, the solvent being a solution of polymethyl methacrylate (PMMA), polyvinyl alcohol, polyvinyl acetate of polystyrene.

7. Microlaser cavity according to claim 1 or 3, the film being a liquid phase epitaxy film.

8. Microlaser cavity according to claim 7, the film being formed from a basic material identical to that of the solid active medium and doped with cry or $Er^{3+}$ or $Ho^{3+}$ ions.

9. Microlaser incorporating a microlaser cavity according to one claims 1 or 3, further including cavity pumping means and means for generating a beam for starting the saturation of the saturable absorber.

10. Microlaser incorporating a microlaser cavity comprising a solid active medium, an input mirror and an output mirror respectively defining an input side and an output side of said microlaser cavity, further including a saturable absorber and means for introducing into said cavity a starting beam, for starting a controlled saturation of the saturable absorber, said starting beam being introduced parallel to an introduction direction into the solid active medium of a pumping beam of said active medium, cavity pumping means and means for generating a beam for starting the saturation of the saturable absorber.

11. Microlaser according to claim 10, wherein said saturable absorber comprises a thin saturable absorber material film directly deposited on the active medium.

12. Microlaser according to claim 11, said saturable absorber film defining a plane, the starting beam introduction means being arranged so as to permit a guided propagation of the starting beam in said plane of said saturable absorber film.

13. Microlaser according to claim 12, said saturable absorber film having an etched microsurface so that, after an introduction of said starting beam into the microlaser cavity, said starting beam is reflected against said etched microsurface, and then propagates and is guided in said plane of said saturable absorber film.

14. Microlaser cavity according to claim 11, said means for introducing a starting beam directing said beam in a direction not contained in the plane of the saturable absorber film, towards an area of the saturable absorber on which the pumping beam is incident.

15. Microlaser cavity according to claim 14, wherein said means for introducing a starting beam includes a microlens portion located on the input side of said microlaser cavity.

16. Microlaser cavity according to claim 11, the film being a liquid phase epitaxy film.

17. Microlaser cavity according to claim 16, the film being formed from a basic material identical to that of the solid active medium and doped with $Cr^{4+}$ or $Er^{3+}$ or $Ho^{3+}$ ions.

18. Microlaser cavity according to claim 3, the film being formed by an organic dye dissolved in a polymer solvent.

19. Microlaser cavity according to claim 18, the organic dye being chosen from among bis (4diethylaminodithiobenzyl) nickel or bis(4-dimethylamino-dithiobenzyl) nickel, the solvent being a solution of polymethyl methacrylate (PUMA), polyvinyl alcohol, polyvinyl acetate of polystyrene.

* * * * *